(12) United States Patent
Rouzes et al.

(10) Patent No.: US 8,243,992 B2
(45) Date of Patent: Aug. 14, 2012

(54) DEVICE FOR OPTICALLY DETECTING POSITION AND/OR ORIENTATION OF OBJECTS COMPRISING AT LEAST ONE LINEAR SENSOR

(75) Inventors: Siegfried Rouzes, Le Haillan (FR); Lilian Lacoste, Milton (GB)

(73) Assignee: Thales, Neuilly sur Seine (FR)

( * ) Notice: Subject to any disclaimer, the term of this patent is extended or adjusted under 35 U.S.C. 154(b) by 413 days.

(21) Appl. No.: 12/566,985

(22) Filed: Sep. 25, 2009

(65) Prior Publication Data
US 2010/0189309 A1 Jul. 29, 2010

(30) Foreign Application Priority Data

Sep. 26, 2008 (FR) ..................................... 08 05315

(51) Int. Cl.
*G06K 9/00* (2006.01)
(52) U.S. Cl. ............ 382/103; 342/147; 348/135; 701/4; 244/171
(58) Field of Classification Search .................. 382/100, 382/103, 106, 107; 342/147; 348/135, 143, 348/169–172; 701/3, 14; 244/164, 171
See application file for complete search history.

(56) References Cited

U.S. PATENT DOCUMENTS

| | | | | |
|---|---|---|---|---|
| 4,964,723 A * | 10/1990 | Murgue et al. | ............ | 356/139.04 |
| 5,267,014 A * | 11/1993 | Prenninger | .............. | 356/139.03 |
| 5,513,276 A * | 4/1996 | Theodoracatos | ............. | 382/154 |
| 5,617,335 A | 4/1997 | Hashima et al. | | |
| 5,974,365 A * | 10/1999 | Mitchell | ........................ | 702/150 |
| 7,826,641 B2 * | 11/2010 | Mandella et al. | ............. | 382/106 |
| 2005/0284984 A1 | 12/2005 | De Lauzun et al. | | |
| 2010/0098325 A1* | 4/2010 | Barbier et al. | ................ | 382/154 |
| 2010/0278387 A1* | 11/2010 | Agurok et al. | ................ | 382/103 |

OTHER PUBLICATIONS

U.S. Appl. No. 12/439,242, filed Aug. 31, 2007.
U.S. Appl. No. 12/439,346, filed Aug. 31, 2007.
U.S. Appl. No. 12/566,958, filed Sep. 25, 2009.
U.S. Appl. No. 12/567,228, filed Sep. 25, 2009.
U.S. Appl. No. 12/566,985, filed Sep. 25, 2009.

* cited by examiner

*Primary Examiner* — Anand Bhatnagar
(74) *Attorney, Agent, or Firm* — LaRiviere, Grubman & Payne, LLP

(57) ABSTRACT

The electro-optical system for determining the attitude of a mobile part comprises a fixed part and a mobile part, the fixed part being linked rigidly with at least one virtual image plane. The mobile part is linked rigidly with at least one first linear electro-optical device defining a first direction vector, the calculation of the position of the vanishing point of the projection of the straight line comprising the first direction vector in the image plane determining a first direction, representing the direction of the mapping of the first direction vector in the image plane, and a first choice of a first point of the projection in the image plane of the straight line comprising the first direction vector determining a first sense, representing the sense of the mapping of the first direction vector in the image plane.

12 Claims, 6 Drawing Sheets

DEVICE FOR OPTICALLY DETECTING POSITION AND/OR ORIENTATION OF OBJECTS COMPRISING AT LEAST ONE LINEAR SENSOR

PRIORITY CLAIM

This application claims priority to French Patent Application Number 08 05315, entitled Dispositif De Detection Optique De Position Et/Ou D'Orientation D'Objets Comprenant Au Moins Un Capteur Lineaire, filed on Sep. 26, 2008.

TECHNICAL FIELD

The present invention relates to the field of devices for optically detecting position and orientation of objects in space. It applies more particularly in the aeronautical field where in this case the detected object is a pilot helmet.

BACKGROUND OF THE INVENTION

The determination of the positioning of a point in space and the determination of the attitude of an arbitrary object are problems relating to numerous technical fields.

The various solutions generally afforded must resolve any ambiguity in position or attitude, cater for more or less severe dynamics in terms of displacement, speeds and accelerations of the systems and satisfy high accuracy, in particular in the aeronautical field.

In systems for detecting position and attitude of objects in space catering for an accuracy of a few millimetres in position and a degree in attitude, numerous applications exist in various fields.

These systems are used in aeronautics; for detecting head posture, notably for the helmets of fighter aircraft, or of military, civilian or para-civilian helicopters. The latter case of para-civilian application may involve rescue missions at sea for example. They are also used for the detection of simulation helmets; this detection can then be combined with an oculometry device, also called an eyetracker, for detecting the position of the gaze. Numerous applications of these systems also exist in the field of virtual reality and games.

More generally, in the field of generic posture detection, there also exist numerous applications, notably in the medical field for remote operations and monitoring of instruments, in the field of position monitoring for feedback-controlled tool machines or of remote control and finally for cinema, so as to reproduce motion as synthesis images.

These various applications have technical solutions which cater for more or less constraining requirements.

Concerning applications with weak constraints, notably in terms of accuracy, there exist various systems for detecting position and/or orientation of objects.

For example, camera-based devices that recognize patches or shapes use designs printed on an object. Several cameras observe the scene and determine the spatial configuration of the observed design.

There also exist camera-based devices that recognize spheres, which are used, for example in cinema, to reconstruct human motion. The device uses several cameras which observe reflecting spheres and determine their trajectory.

Finally there exist ultrasound positioning devices relying on the principle of triangulation between ultrasonic emitters and receivers.

Concerning higher-performance applications, in particular in the aeronautical field, devices for detecting posture of helmets in aircraft use two main techniques, namely electromagnetic posture detection and electro-optical posture detection.

Electromagnetic posture detection requires devices comprising means for emitting an electromagnetic field and reception sensors on the helmet making it possible to determine their position with respect to the emitter.

Electro-optical posture detection generally requires patterns of electroluminescent diodes, also called LEDs, disposed on the helmet and several sensors of camera type mounted in the cockpit making it possible to determine the spatial configuration of a pattern of LEDs.

To improve performance, other devices comprising sensors of gyroscopic, accelero-metric or magneto-metric types are frequently combined. This hybridization of sensors makes it possible to improve the dynamic performance or to resolve an ambiguity of orientation. These sensors do not modify the static positioning performance of the detection devices cited above.

Nevertheless, these solutions exhibit a certain number of drawbacks and limitations, particularly in the aeronautical field.

Moreover, these same devices require several cameras and several sensors. The position calculations demand numerous resources and the real-time analysis is complex to implement.

Moreover, one drawback results from the diffusion in the zone of detection of the light of the LEDs and another drawback results from the disturbances of the luminous environment of the cockpit due to the sun or to stray reflections on the canopy.

As regards electromagnetic posture detection devices, robust solutions are difficult to implement.

In particular, in the aeronautical field, stray radiations and electromagnetic disturbances may degrade the performance of the existing systems.

A solution implementing a device of electro-optical type such as described in patent FR 2 905 455 makes it possible to circumvent the drawbacks of the electromagnetic devices.

Moreover, this solution preferably uses image projection means of the video-projector type.

In particular, monochromatic laser video-projectors have the advantages of emitting in a very narrow band of frequencies, a sharp image in a wide field and of making it possible to concentrate a high energy in a very small zone. The signals arising from the video-projector can very easily be distinguished from stray light.

More precisely, this solution comprises electro-optical sensors disposed on the object and distributed in groups, called clusters, analysis and calculation means making it possible to retrieve the position and/or the attitude of the object, electronic means for generating images and optical projection means comprising a display and projection optics.

The optical projection means emit in a projection cone a sharp image at every point of the displacement zone in which the object can move. Analysis of the portions of images received by the sensors of at least one cluster makes it possible to chart the position and/or the attitude of the object in the reference frame defined by the projection means, the latter consisting of a plane perpendicular to the projection axis, termed the image plane, and of the projection axis.

Finally, this solution coupled with that described in patent FR 0706132 makes it possible to define clusters whose geometric properties are notably linear sensors disposed as parallelograms, therefore coplanar, on the object, the determination of whose motion is sought.

A drawback of such a sensor is the constraint of accuracy of mechanical transfer of the sensors onto their support. Indeed, one typically seeks to obtain accuracies of the order of a milliradian in orientation on linear sensors of a length of the order of 3 cm. This imposes a transfer accuracy of the order 30 µm which must be maintained under all temperature conditions, inter alia. If the sensor is in a plane and possesses a parallelepipedal form, it must be potentially transferred onto ceramic and necessitates a very specific manufacturing process.

Moreover, this disposition contributes to the compounding of errors of mechanical tolerancing, for example in the positioning of the sensor on the helmet and as regards the accuracy of the sensor. The latter solution requires accurate calibration of the sensor, which may involve the storage of correction coefficients at sensor level so as to be able to attain the desired accuracy level.

SUMMARY OF THE INVENTION

The invention proposes to solve this problem, notably by relaxing the planarity constraint on the sensors disposed on the mobile object.

In particular, the invention exhibits the benefit of making it possible, on the basis:
  of a single linear sensor rigidly linked with the mobile object;
  of the projection of test grids comprising at least two secant networks of at least three parallel segments;
  of the calculation of the position of the vanishing point, in the image plane, of the straight line comprising the sensor;
to ascertain the direction of the linear sensor in space.

The system according to the invention exhibits great flexibility as regards the disposition of a linear sensor on an object, weak mechanical constraints and a notable saving in calculations as regards the determination of the direction of the sensor.

Moreover, with the above conditions, the invention makes it possible, by ascertaining the position of two points of the sensor in the benchmark frame of the sensor, to ascertain their projection in the image plane and to deduce therefrom the sense of the linear sensor in space.

Finally, the invention makes it possible, by ascertaining:
  the positioning of two sensors on a mobile object;
  their relative position on the object;
  the position of two points of the sensor in the benchmark frame of each sensor;
to ascertain the posture of the mobile object in space, and therefore the rotation and the translation with respect to a reference position of the object in an identified reference frame.

The various linear sensors positioned on the mobile part having no inter-relationship, except for a condition of mutual non-collinearity and a rigid link with the mobile part.

Advantageously, the electro-optical system for determining the attitude of a mobile part comprises means for determining at least one direction of the said mobile part, the said system comprising a fixed part having a reference point (O) and a mobile part, the fixed part being linked rigidly with an image plane.

Advantageously, the mobile part is linked rigidly with at least one first linear electro-optical device defining a first direction vector, the fixed part projecting in a first zone comprising the first electro-optical device, at least two networks of beams, whose intersection with a plane perpendicular to the mean axis of projection defines at least two networks of non-parallel straight lines, each of the networks of straight lines comprising at least three parallel segments, the beams intercepting the electro-optical device in at least two pairs of triples of points, the system comprising means for calculating a first calculation comprising the determination of the position of a first point (E) in the image plane on the basis of the positions of the six projections in the image plane of the two pairs of triples of points, the first point (E) corresponding to the vanishing point of the straight line comprising the first direction vector, the straight line comprising the reference point (O) and the first point (E) determining a first direction, the said direction representing the direction of the straight line comprising the first linear electro-optical device.

Advantageously, in a first embodiment, the projection comprises a test grid comprising on the one hand a first network of beams of three first mutually parallel luminous segments, intercepting the sensor at three points ($A_1, B_1, C_1$), and on the other hand a second network of beams of three mutually parallel luminous segments, intercepting the sensor at three other points ($A_2, B_2, C_2$), the two networks of beams making an angle between themselves such that the form of the two networks of beams represents a broken line forming at least three sawteeth.

Advantageously, in a second embodiment, the system successively projects two test grids comprising respectively a first and a second network of beams having the same characteristics, for which the orientation of the second network of beams with respect to the first network of beams forms a determined angle, the networks of beams having a sufficient width (D) to cover the zone of displacement of the sensor and comprising a determined number of parallel segments, for which the cross ratios of four consecutive segments are all different.

Advantageously, the linear electro-optical device being oriented by a first pair of points ($A_0, B_0$) situated on the electro-optical device, a second calculation of the positions of the mappings (A, B) of the first pair of points ($A_0, B_0$) on the image plane determines the sense of the said electro-optical device in space by comparison of the order of alignment of the first pair of projected points (A, B) and of the first point (E) in the image plane.

Advantageously, a second electro-optical device is linked rigidly with the mobile part, the said second device defining a second direction vector, not collinear with the first direction vector, the position of the second device with respect to the first device being known in a benchmark frame linked with the mobile part, a third calculation of the position of a second point (F) arising from the projection in the image plane of the vanishing point of the straight line comprising the second direction vector, the straight line comprising the reference point (O) and the second point (F) determining a second direction, the said second direction representing the direction of the straight line comprising the second linear electro-optical device.

Advantageously, the second linear electro-optical device being oriented by a second pair of points ($K_0, L_0$) situated on the second linear electro-optical device, a fourth calculation of the positions of the mappings (K, L) on the image plane of the second pair of points situated on the second linear electro-optical device ($A_0, B_0$) determines the sense of the said second linear electro-optical device in space by comparison of the order of alignment of the second pair of projected points (K, L) and of the second point (F) in the image plane.

Advantageously, the first calculation and/or the third calculation comprises the determination:
  of a point M(X,Y) belonging to the straight line comprising a linear electro-optical device;
  of a first quadruple of points defined by the mapping of the point M and of a first triple of points;

of a second quadruple of points defined by the mapping of the point M and of a second triple of points;

of the relative positions of the points of the two triples of points on an electro-optical device;

of the position of the mapping in the image plane of the point M on the basis of the law of conservation of a cross ratio of a quadruple of points under a central projection;

of the position of a vanishing point (E, F), corresponding to the mapping of the point M when the latter is considered positively at infinity on the straight line comprising an electro-optical device.

Advantageously, the mobile part undergoes a motion which decomposes into a rotation and a translation in space which are charted with respect to a reference position.

Advantageously, the rotation of the mobile part in space is determined by a fifth calculation comprising:

a first step of determining:

a first normed direction vector $\vec{e_0}$ collinear with the vector formed by the first pair of points ($A_0$, $B_0$), corresponding to a known reference position of the first electro-optical device;

a second normed direction vector $\vec{f_0}$ collinear with the vector formed by the second pair of points ($K_0$, $L_0$) corresponding to a known reference position of the second electro-optical device;

a third normed vector $\vec{u_0}$, the vector product of the first and second vector;

a second step of calculating:

the positions of the vanishing points E and F respectively of the straight lines comprising the image vector ($\overrightarrow{A'B'}$) by the rotation r of the first direction vector ($\overrightarrow{A_0B_0}$) and the image vector ($\overrightarrow{K'L'}$) by the rotation r of the second vector ($\overrightarrow{K_0L_0}$);

the vectors $\overrightarrow{OE}$ and $\overrightarrow{OF}$;

fourth and fifth normed vectors $\vec{e}$ and $\vec{f}$ collinear respectively with $\overrightarrow{OE}$ and $\overrightarrow{OF}$;

a sixth normed vector $\vec{u}$, the vector product of the fourth and fifth vectors;

a third step of determining the rotation r by the product of a first matrix formed of the first, second and third vectors and of the inverse of a second matrix formed of the fourth, fifth and sixth vectors, the analytical expression of the rotation being:

$r=[\vec{e};\vec{f};\vec{u}]\cdot[\vec{e_0};\vec{f_0};\vec{u_0}]^{-1}$.

Advantageously, the translation t is determined through the relation:

$\vec{t}=k\overrightarrow{OA}-r(\vec{A_0})$, where O is the reference point of the fixed part, A the mapping in the image plane of a known point of the first electro-optical device, denoted $A_0$, and k is expressed in the following manner:

$$k = (\mu-1)\frac{A_0B_0}{OE},$$

where E is the image of the vanishing point in the image plane and $B_0$ is a second known point of the second linear electro-optical device, and $\mu$ is a known real expressed in the following manner:

$\overrightarrow{AE}=\mu\overrightarrow{AB}$.

Advantageously, the comparison of two successively calculated directions of a sensor determines a component of the motion of the mobile object in space.

Advantageously, the electro-optical device is a linear sensor, the fixed part is a video image projector and the mobile object is a pilot helmet.

Advantageously, a pilot helmet comprises at least two non-collinear linear electro-optical devices.

BRIEF DESCRIPTION OF THE DRAWINGS

Other characteristics and advantages of the invention will become apparent with the aid of the description which follows, given with regard to the appended drawings which represent.

DETAILED DESCRIPTION OF THE INVENTION

A principle of the invention relates to the determination of the posture of a mobile part in space on the basis of a fixed part comprising an image projector. The mobile part comprises sensors and the images are projected in a zone comprising the sensors.

The effectiveness of such a system for detecting motion of a mobile part relies on the form, the number and the disposition of the sensors on the mobile part, moreover it relies on the sharpness of the projected images, of the form and of the brightness of the projected test grids.

Other characteristics can be taken into account in such a system notably with regard to the descriptions of the following two published patent applications:

Patent application FR 2 905 456, detailing the principle according to which an image projector makes it possible to ascertain the motion of an object comprising a certain number of sensors forming clusters.

Patent application FR 2 905 455, detailing a method for detecting the orientation and position of an object in space, such as a pilot helmet, for which the disposition of the sensors on the object can form parallelograms.

A final prerequisite principle for the understanding of the present invention relies on a method for detecting the ends of a linear sensor in space by projections of test grids. This principle is stated in patent application FR 0 706 132.

Figure 1:
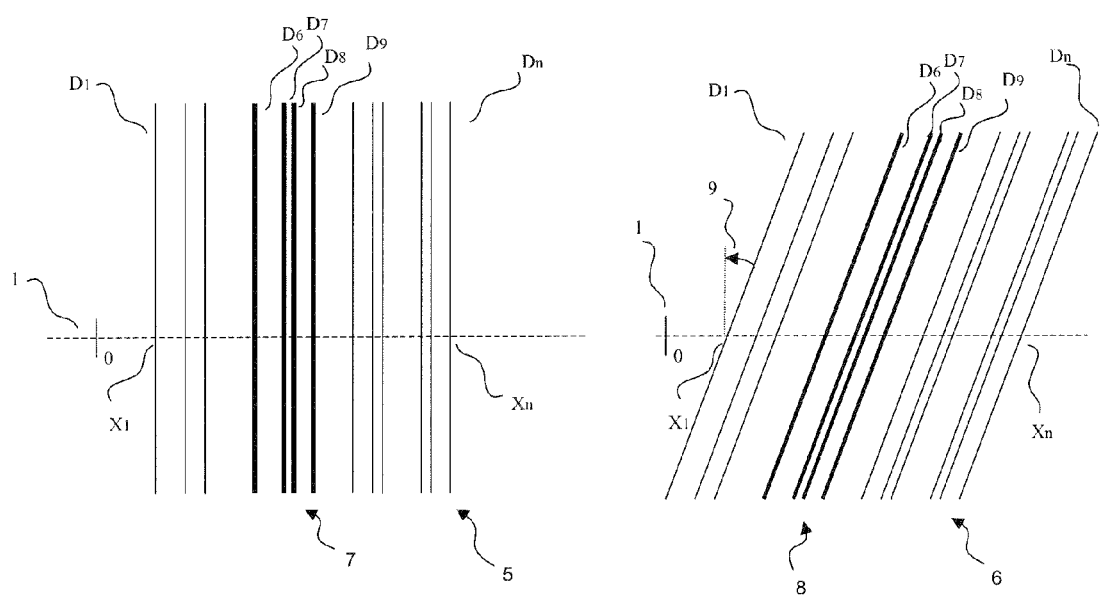
FIG. 1: a first example of test grids projected onto a sensor forming a network of parallel straight lines.
Figure 2:
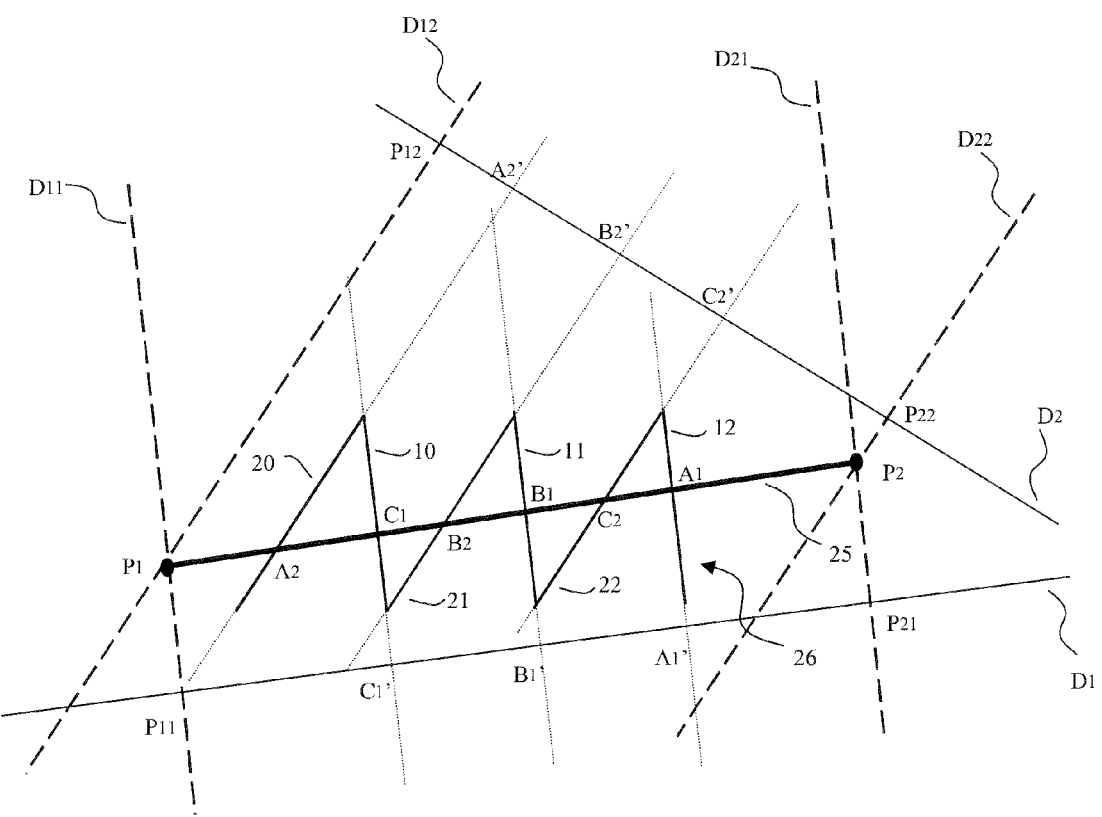
FIG. 2: a second example of test grids projected onto a linear sensor forming teeth.

The latter principle is detailed again in the present description in FIGS. 1 and 2. This principle is used in the present invention, no longer for calculating the ends of a linear sensor, but to calculate any point whatsoever of the straight line comprising the linear sensor.

Nevertheless, part of the geometric reasoning is performed in the image plane through the consideration of the position of projected points and through the conservation of the cross ratios arising from the patterns of the test grids projected onto the sensors. A property of the patterns of the projected test grids is notably that of comprising two secant networks of at least three parallel segments.

Hence what follows is organized in the following manner:

Initially, the present description comprises a reminder of the geometric method of determining a point, on the image plane of a projector, arising from the projection of a point of a sensor illuminated by a test grid whose patterns are known. The latter reminder specifies notably, on the basis of the conservation of the cross ratios in a cylindrical projection, how the positions of the ends of a sensor can be calculated.

Subsequently, the system of the invention is described together with the analytical expression of the method previously described for calculating the position of a vanishing point in the image plane of a straight line of the space comprising a linear sensor.

Method of Determining the Ends of a Sensor.

This principle makes it possible, on the basis of projection means, projecting a sharp image in a determined zone comprising at least one linear sensor, to ascertain the ends of the sensor fixed to an object, the ends being charted in the image plane.

The knowledge of the ends of the projection of two linear sensors allows us to ascertain the posture of an object linked rigidly with the two sensors, on condition that the two sensors are not collinear.

This principle comprises various steps of constructing the locus of the ends of a linear sensor in the image plane of the projected image, the sensor being situated in a plane in space.

The principle consists in projecting a test grid in a zone of space comprising the sensor. The image must necessarily be sharp in this zone of space. Such a constraint can be solved by using for example a holographic video projector such as developed by "Light Blue Optics".

The first step of the method recalled in the present description comprises two modes which are differentiated, on the one hand, through the a priori knowledge of the expanse of the zone in which the sensor is situated and, on the other hand, through the type of test grids projected as a function of this zone. A first mode corresponds to a situation of initialization of the method, the position of the sensor not being known in space, the projection field is therefore wide. A second mode corresponds to a situation of feedback control of the system, the position of the sensor being known through an earlier detection, the projection means emit an image along a known direction in a narrower field, whose size is of the order of magnitude of the size of the sensor, the sensor being situated in the field. The latter mode is subsequently called the "tracking" mode since the test grid follows the sensor.

On initialization of the method, the absence of knowledge of the position of the sensor in space, makes it necessary to consider, for example, a family of particular test grids covering the possible zone of displacement of the sensor. In the example of detecting a helmet in a cockpit, the helmet comprising linear sensors, the zone of greater expanse covers a large part of the cockpit.

The second mode corresponds to a detection while a previous position of the sensor is known. This mode makes it possible to define a smaller image than that projected in the first mode. This second mode uses another family of test grids.

In both modes the detection method, having regard to the two families of test grids, is identical. The initialization mode nevertheless proposes a method for detecting the zone in which the sensor is situated which comprises an additional step.

The second mode allows a gain of accuracy in the calculations notably of the position of the image of the sensor in the image plane. Furthermore, this second mode makes it possible to emit test grids whose light density is higher in the emitted patterns than in the first mode, therefore detection is more effective.

This second mode generally operates in a feedback-controlled mode which is initialized by the first mode.

We will dub the test grids used in the first mode: "general test grids", and the test grids of the second mode: "tracking test grids", the two families of test grids being called "GHOST" test grids subsequently in the description.

The test grids are defined in the image plane of the projected image. Generally this plane is not parallel to the plane comprising a sensor.

A principle of the method relies on the fact that the information read on the sensor, corresponding to the traces of the test grid, makes it possible to calculate a projection invariant. This issue is common to the general test grids and to the tracking test grids.

In both modes, the principle of detection of the ends of a sensor makes it possible, on the basis of the knowledge of three parallel straight lines of the network in the image plane and of their trace on the sensor, to trace in the image plane two straight lines passing through each of the ends of the sensor and parallel to the network considered.

It is therefore necessary to consider two networks of three straight lines, not possessing the same orientations in the image plane, so as to trace two pairs of two secant straight lines, the intersections defining the ends of the image of the sensor in the image plane. In this case, the method makes it possible to deduce the ends of the image of the sensor by constructing the intersections of the straight lines passing through the said ends. This construction is made possible since the projection of an intersection of straight lines is the intersection of the projections of the straight lines.

The objective of the general test grids is distinguished from the tracking test grids through the fact that the triple of straight lines whose trace on the sensor is read is not known a priori; it is therefore necessary to be able to identify it. In this context, the method makes it possible to consider a network of parallel straight lines such that any quadruple of successive straight lines of the network defines a unique cross ratio. The uniqueness of the cross ratio of a quadruple defines a unique quadruple and therefore renders a triple of straight lines intercepting the sensor identifiable. In practice, this may turn out to be difficult to carry out for various reasons. Thus, the method also applies to a set of more than four straight lines. It is possible to envisage identifying in a unique manner not a quadruple, but a quintuple or any set of N straight lines (N greater than 4). For a set of N straight lines, the method applies to a more extensive space and allows the best separation of the points and therefore the groups of straight lines.

The definition of a cross ratio of four aligned points is recalled below.

The cross ratio $B_R$ of four aligned points A, B, C, D is defined by the following relation:

$$B_R(A, B, C, D) = \frac{\overline{AC}}{\overline{BC}} \cdot \frac{\overline{BD}}{\overline{AD}};$$

expressed as an algebraic value by the following relation:

$$B_R(x1, x2, x3, x4) = \frac{x3 - x1}{x3 - x2} \cdot \frac{x4 - x2}{x4 - x1},$$

where x1, x2, x3 and x4 are the abscissae of the points A, B, C, D, the latter being defined on a straight line containing the points and having a reference point of the straight line as origin.

This principle of location by test grids is applied to several sensors each having a different orientation.

Thus, for a given sensor, it is necessary to have available two general test grids, of different directions and sent successively, so as to find the two ends of a sensor in the image plane.

Thus, a general test grid consists of any network of straight lines parallel to the image plane such that:
  the network is at one and the same time sufficiently extensive and sufficiently tight, to ensure that it intercepts the sensor in at least four points;
  the network is everywhere sufficiently loose so that it is possible to distinguish without possible confusion on the sensor the spots corresponding respectively to any 2 adjacent straight lines of the network;
  the mapping which sends any quadruple or more of successive straight lines of the network to its inherent cross ratio is a bijection, and this bijection is sufficiently dispersive to ensure that it is always possible to retrieve the antecedent quadruple without possible confusion.

FIG. 1 represents an example of two networks 5 and 6 sent successively from two general test grids, making an angle 9 between themselves. The two quadruples 7 and 8 consist of the straight lines D6, D7, D8, D9 and possess a single cross ratio. The detection of the four points of intersection of each network on the sensor makes it possible to identify a zone of smaller expanse so as to project tracking test grids such as described hereinafter in FIG. 2. Moreover, the method makes it possible according to the method described subsequently on the basis of the tracking test grids to construct the ends of the image of the sensor in the image plane. It suffices to apply the method to the two networks sent successively and to consider three straight lines of each quadruple of each network intercepting the sensor.

The duration between two projections of two general test grids is necessarily limited in such a way that the sensor does not perform too large a motion in space during its movement.

The method makes it possible in the two modes to construct the ends of the image of the sensor in the image plane on the basis of two networks projected simultaneously (case of the tracking test grids) or successively (case of the general test grids), the networks comprising at least three parallel straight lines (or segments) in the case of the tracking test grids and at least four straight lines in the case of the general test grids.

The method makes it possible to send two networks of three straight lines, the networks not being parallel, so as to retrieve the ends of the linear sensor in the image plane.

In the first mode, the two networks of straight lines, each constituting a general test grid, are projected successively in the zone comprising the sensor. On the other hand, in the second mode, the two networks of straight lines (or segments) are projected in a unique tracking test grid, that is to say as a single image.

FIG. 2 illustrates a tracking test grid 26 in the projection image plane. It comprises a first network of three mutually parallel luminous segments 10, 11 and 12 and a second network of three segments 20, 21 and 22. The two networks projected in the same image simultaneously are not parallel and are joined by the ends of the segments. In the example of FIG. 2, they are joined by the upper ends of each segment forming a sawteeth figure.

In practice, the image consisting of the luminous segments is deformed in the straight line or the plane comprising the sensor, by a conical projection, when it intercepts the linear sensor, the plane of the sensor and the plane of the projected image not being a priori parallel. The sensor therefore detects the luminous points which correspond to the points of intersection of the projected image with the sensor. The method considers the image of the sensor in the plane of the projected image, the image of the sensor then being deformed by the conical projection considered above, in the image plane.

FIG. 2 represents the image 25 of the sensor in the image plane. The cross ratios of the distances between the points of intersection of the sensor and of the straight lines of the network are conserved by the conical projection. The image 25 of the sensor comprises two ends P1 and P2 in the image plane which are not known a priori, the construction of their position in the image plane constituting the core of the method. Moreover, in the image plane the first network intercepts the image 25 of the sensor at three points A1, B1 and C1, these last three points being the mappings in the image plane of the points of intersection of the first network with the sensor. The second network intercepts the image 25 of the sensor at three other points A2, B2 and C2, these last three points being the mappings in the image plane of the points of intersection of the second network with the sensor.

The method subsequently described is also valid for the general test grids and constitutes the second step of the method.

When considering the sensor in space, one of the ends of the sensor may be considered to be the origin of a reference frame comprising the abscissa axis borne by the axis of the sensor; $0, X_{A2}, X_{C1}, X_{B2}, X_{B1}, X_{C2}, X_{A1}\ X_{max}$ then denote the respective abscissae of the points of intersection of the first and of the second network with the sensor as well as the other end of the sensor, their mappings in the image plane being respectively the points P1, A2, C1, B2, B1, C2, A1 and P2 in the plane of the sensor.

The method makes it possible to consider the cross ratios $k_{11}$, $k_{12}$, $k_{21}$, $k_{22}$ of quadruples of points defined on the abscissa axis of the axis of the sensor by the following relations, $B_R$ being the cross ratio of four previously defined points:

$$k_{11} = B_R(x_{A1}, x_{B1}, x_{C1}, 0);$$

$$k_{12} = B_R(x_{C1}, x_{B1}, x_{A1}, x_{max});$$

$$k_{21} = B_R(x_{C2}, x_{B2}, x_{A2}, 0);$$

$$k_{22} = B_R(x_{A2}, x_{B2}, x_{C2}, x_{max}).$$

Finally the third step of the method makes it possible to construct the ends of the image of the sensor in the image plane. The aim being to find the ends of the sensor in the image plane, by construction under conical projection and conservation of the cross ratios in the plane of the sensor and in the image plane of the quadruples previously considered, it is then easy to retrieve the position of the sensor in space.

Accordingly, the method proposes to use notably the conservation of the cross ratios of four points under conical and cylindrical projections.

Concerning the conical projection relating to the projection of the image onto the sensor, the method makes it possible to consider the cross ratios $k_{11}$, $k_{12}$, $k_{21}$, $k_{22}$, conserved by the conical projections of the quadruples of the points defined previously on the straight lines D1 and D2, by the following relations:

$$k_{11} = B_R(A1, B1, C1, P1);$$

$$k_{12} = B_R(C1, B1, A1, P2);$$

$$k_{21}=B_R(C2,B2,A2,P1);$$

$$k_{22}=B_R(A2,B2,C2,P2).$$

The method firstly proposes to construct in the image plane two straight lines perpendicular to each network. The first straight line D1 is perpendicular to the first network, it is placed arbitrarily in the lower part of the image. The straight lines 10, 11 and 12 bearing the luminous segments of the first network intercept the straight line D1 at three points A1', B1' and C1'. In the same manner, the second straight line D2 is perpendicular to the second network, it is placed arbitrarily in the upper part of the image. The straight lines 20, 21 and 22 bearing the luminous segments of the second network intercept the straight line D2 at three points A2', B2' and C2'.

One seeks to determine the ends P1 and P2 of the image of the sensor in the image plane. Each of these points possesses two mappings on the straight lines D1 and D2 along the axis parallel respectively to the first and to the second networks. We denote by P11 the mapping of P1 on D1 along the axis of the first network and by P12 the mapping of P1 on D2 along the axis of the second network. In an analogous manner, we denote by P21 the mapping of P2 on D1 along the axis of the first network and by P22 the mapping of P2 on D2 along the axis of the second network.

The method makes it possible to consider the cross ratios $k_{11}$, $k_{12}$, $k_{21}$, $k_{22}$, conserved by the cylindrical projections of the quadruples of the points defined previously on the straight lines D1 and D2, by the following relations:

$$k_{11}=B_R(A1',B1',C1',P11');$$

$$k_{12}=B_R(C1',B1',A1',P21);$$

$$k_{21}=B_R(C2',B2',A2',P12);$$

$$k_{22}=B_R(A2',B2',C2',P21).$$

From which it is possible to deduce:
the point P11 knowing $k_{11}$ and A1', B1', C1';
the point P21 knowing $k_{21}$ and A1', B1', C1';
the point P12 knowing $k_{12}$ and A2', B2', C2';
the point P22 knowing $k_{22}$ and A2', B2',C2'.

Next, it is possible to construct in the image plane the straight lines:
D11 knowing P11 and the direction of projection of projection along the axis of the first network;
D21 knowing P21 and the direction of projection of projection along the axis of the second network;
D12 knowing P12 and the direction of projection of projection along the axis of the first network;
D22 knowing P22 and the direction of projection of projection along the axis of the second network;
The two directions being known by construction of the test grid.

The two ends of the image of the sensor in the image plane are obtained according to the method by construction:

$$P1=D11 \cap D12;$$

$$P2=D21 \cap D22.$$

Algebraically, the latter operation in two dimensions possesses a solution provided that the two networks are not collinear. By construction they are not collinear for the tracking test grids when they are projected onto one and the same image and neither are they collinear when successively sending two general test grids.

The demonstration is identical for two non-parallel networks sent successively by the projection of general test grids, the time between two sends being short enough to consider that the sensor has hardly changed position in space.

Application of the Principle to the Present Invention.

The system according to the invention makes it possible to use the latter principle by no longer considering the two ends of the sensors, but an arbitrary point of the straight line comprising the sensor, notably the vanishing point of this straight line.

The system according to the invention applies equally well to the use of the general test grids for the initialization of the detection and to the use of the tracking test grids for the mode of feedback control of the detection. It therefore applies to the family of test grids dubbed GHOST test grids.

Moreover, the constraint of a disposition of the sensors being coplanar is no longer necessary in the device described in FIGS. 3, 4, 5 and 6.

Furthermore, the system according to the invention makes it possible on the basis of a single linear sensor positioned on the mobile part and of a projector projecting at least one test grid comprising two networks of secant beams of at least three parallel straight lines:
to determine, initially, the direction of the sensor in space, this direction being determined by the straight line comprising the sensor and;
to determine, subsequently, the sense of the sensor in space, the sense being given by the order of the pixel abscissae in which the sensor provides its measurements.

The knowledge of the variation over time of two directions or of two successive senses of a sensor then makes it possible to ascertain the evolution of a part of the motion of the object in space.

Figure 3:
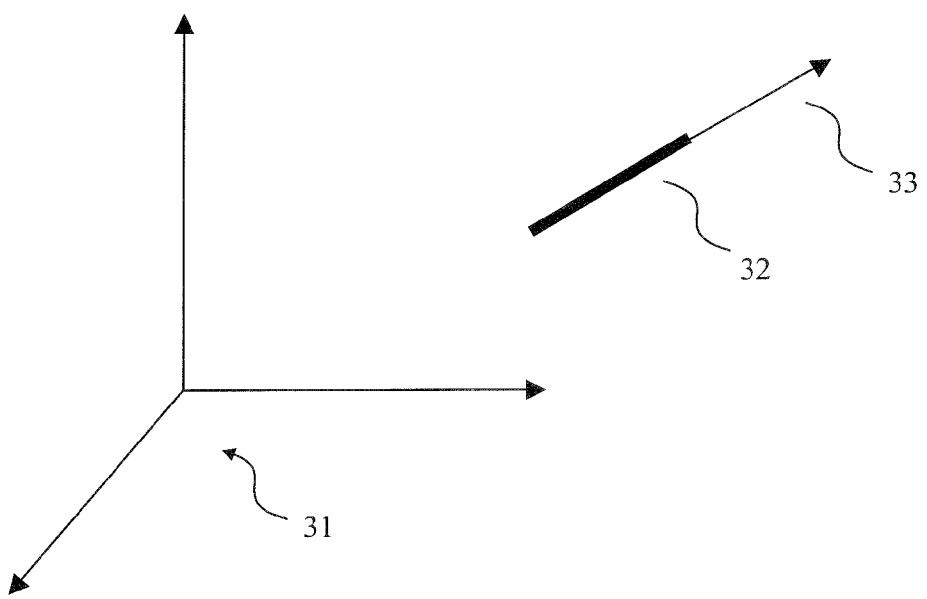
FIG. 3: a linear sensor of CCD type.

FIG. 3 represents a linear sensor 32, which may be for example a CCD, the direction vector 33 designates its orientation in space. The sensor 32 is linked rigidly with a mobile part, not represented, such as an object, the aim of which is to search for the posture on the basis of a fixed part in the benchmark frame 31. In a favoured embodiment the fixed part is an image projector, such as a holographic projector described in patent FR 2 905 455. It then projects GHOST test grids, that is to say comprising at least two networks of at least three parallel straight lines in a zone comprising a linear sensor.

A principle of the invention relies on the determination of the posture of the object on the basis of the configuration in the image projective plane, the latter being linked with the fixed part, of the projection of direction vectors of the sensors linked rigidly with the mobile part.

The invention makes it possible on the basis of a linear sensor positioned on the mobile part to determine the direction and then the sense of the direction vector linked with the linear sensor.

Based on a second linear sensor positioned on the mobile part, the determination of its direction and of its sense makes it possible to construct a basis formed of the direction vector of a first sensor, of the direction vector of a second sensor and of the vector product of the two vectors. This basis is not necessarily orthonormal.

In addition to the constraint of the coplanar disposition of the sensors which is relaxed in the present invention, one of the main advantages of the invention is to circumvent the calculation of the locus of the ends of the sensors, as was detailed previously in the example of the use of the GHOST test grids for the calculation of the locus of the ends.

An advantage of the invention resides in the consideration of the projection in the image plane of the vanishing point of the straight line bearing a sensor. The calculation of the position of the projection of the vanishing point requires the method previously detailed in FIGS. 1 and 2 and uses the conservation of the cross ratios when sending a GHOST test grid onto a linear sensor.

From the position of the mapping of the vanishing point in the image plane, the invention makes it possible to deduce therefrom the direction of the sensor in space.

Figure 4:
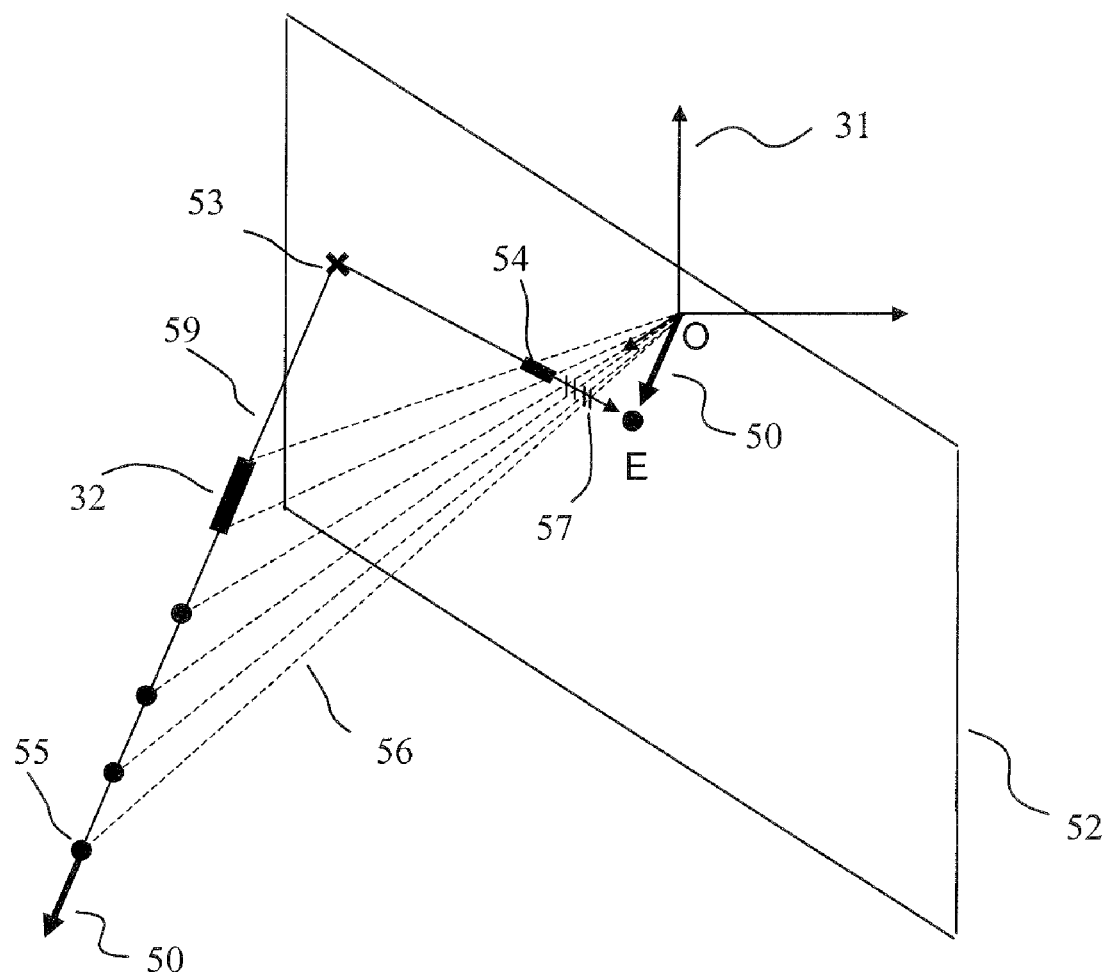
FIG. 4: two linear sensors of CCD type.

FIG. 4 represents a linear sensor 32, such as a CCD, placed on a mobile part which is not represented. The straight line 59 is the straight line bearing the linear sensor 32, it intercepts the image plane 52 of the fixed image projector at a point 53.

The fixed part comprising an image projector is situated at the point O, the centre of the benchmark frame 31 from where are projected the images according to the image plane 52.

As described previously, the projection onto a CCD of a GHOST test grid, that is to say a test grid comprising at least two secant networks of mutually parallel straight lines, makes it possible to find the image of any point situated on the straight line bearing the CCD, the position of a point being defined by its abscissa on this straight line.

An advantage of the invention is to make it possible to ascertain the direction of a sensor by a first calculation of the position of the projection in the image plane of the vanishing point of the straight line comprising the sensor.

In the present invention, to find the projection E in the image plane of the vanishing point, giving the direction of the CCD, it is necessary to stretch the abscissa of the point on the straight line of the sensor to infinity. The projection of the vanishing point E in the image plane 52 of the straight line 59 comprising the linear sensor 32 is determined in an analytical manner.

The algorithm, previously described in FIGS. 1 and 2 on the basis of a projected test grid making it possible to determine the ends of a sensor in the image plane, can be applied so as to find the projection of the vanishing point E of the straight line 59 comprising the sensor 32.

For this purpose, a reference frame, with origin O, is considered; the image plane is for example the plane with equation X=1.

Basically, a GHOST test grid (for initialization or tracking) comprises at least two networks of three parallel straight lines. The equations of the straight lines of FIG. 2, known in the image plane, can take the following form:

$$x \sin \Theta 1 - y \cos \Theta 1 = c_{11};$$

$$x \sin \Theta 1 - y \cos \Theta 1 = c_{12};$$

$$x \sin \Theta 1 - y \cos \Theta 1 = c_{13};$$

where $\Theta 1$ is the angle formed by the direction of the first network with a predetermined vector of the base of the reference frame, the said vector being collinear with the image plane, $$x \sin \Theta 2 - y \cos \Theta 2 = c_{21};$$

$$x \sin \Theta 2 - y \cos \Theta 2 = c_{22};$$

$$x \sin \Theta 2 - y \cos \Theta 2 = c_{23};$$

where $\Theta 2$ is the angle formed by the direction of the second network with the predetermined vector of the base of the reference frame.

The planes of projection of these straight lines cut the sensor considered at six points with measured and identified abscissae denoted for a given sensor: $a_{11}, a_{21}, a_{12}, a_{22}; a_{13}, a_{23}$ representing respectively the abscissae previously denoted: $x_{A2}, x_{C1}, x_{B2}, x_{B1}, x_{C2}, x_{A1}$.

To determine the image of an arbitrary point which is on the straight line comprising the sensor, a point M is considered on the straight line 59 bearing the sensor 32 and having a known abscissa $X_M$ on the said straight line.

The image of M is at the intersection of the following constructed straight lines:

$$x \sin \Theta 1 - y \cos \Theta 1 = c_{1M};$$

$$x \sin \Theta 2 - y \cos \Theta 2 = c_{2M}.$$

Using the above six straight line equations, the coefficients $c_{1M}$ and $c_{2M}$ can be expressed in the following manner, in the case where $X_M \neq a_{i2}$:

$$c_{iM} = \frac{t_i \cdot c_{i2} \cdot (c_{i3} - c_{i1}) - c_{i1}(c_{i3} - c_{i2})}{t_i \cdot (c_{i3} - c_{i1}) - (c_{i3} - c_{i2})},$$

with $$t_i = \frac{(X_M - a_{i1}) - (a_{i3} - a_{i2})}{(X_M - a_{i2}) - (a_{i3} - a_{i1})}.$$

In a second case, if $X_M = a_{i2}$, we then have $c_{iM} = c_{i2}$.

The coordinates of the mapping $m(x_m, y_m)$ of M in the image plane are then obtained:

$$x_M = \frac{c_{2M} \cdot \cos\theta_1 - c_{1M} \cdot \cos\theta_2}{\sin(\theta_2 - \theta_1)};$$

$$y_M = \frac{c_{2M} \cdot \sin\theta_1 - c_{1M} \cdot \sin\theta_2}{\sin(\theta_2 - \theta_1)}.$$

Thus the invention makes it possible to calculate the coordinates of any point projected in the image plane of the straight line comprising a linear electro-optical device, from the moment that the electro-optical device has been intercepted by a GHOST test grid.

In particular, if the vanishing point of the straight line comprising the linear electro-optical device is considered, it suffices to consider a point of the straight line at infinity.

The coordinates of the projection E of the vanishing point on the image plane are obtained by stretching $X_M$ to infinity positively.

The above formulae are therefore obtained with $$t_i = \frac{(a_{i3} - a_{i2})}{(a_{i3} - a_{i1})}.$$

The coefficients $c_{1M}$ and $c_{2M}$ become:

$$c_{1M} = \frac{\frac{(a_{13} - a_{12})}{(a_{13} - a_{11})} \cdot c_{12} \cdot (c_{13} - c_{11}) - c_{11}(c_{13} - c_{12})}{\frac{(a_{13} - a_{12})}{(a_{13} - a_{11})} \cdot (c_{13} - c_{11}) - (c_{13} - c_{12})};$$

$$c_{2M} = \frac{\frac{(a_{23} - a_{22})}{(a_{23} - a_{21})} \cdot c_{22} \cdot (c_{23} - c_{21}) - c_{21}(c_{23} - c_{22})}{\frac{(a_{23} - a_{22})}{(a_{23} - a_{21})} \cdot (c_{23} - c_{21}) - (c_{23} - c_{22})}.$$

The direction of the sensor is then given by the straight line (OE), O being a reference point of the fixed part.

At this juncture, the invention makes it possible to determine following the projection of a GHOST test grid onto a sensor to calculate the position, on the image plane, of the image of the vanishing point of the straight line comprising the said sensor and to consequently deduce therefrom the direction of the sensor.

The invention proposes, on the basis of the determination of two known points of a linear electro-optical device, such as the ends for example or any other pair of points of the linear electro-optical device, to ascertain the sense of the sensor.

Indeed, the sense of the sensor is deduced from the determination of two of the points of the straight line projected onto the image plane of the straight line bearing the sensor.

Figure 6:
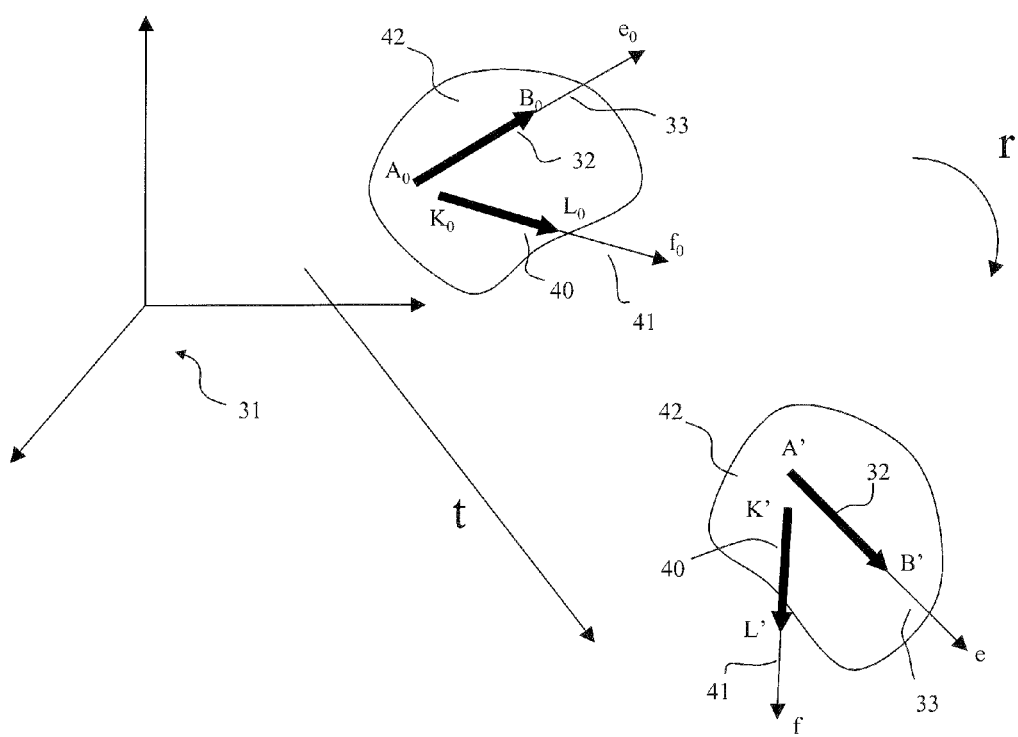
FIG. 6: a mobile object in space having undergone a rotation and a translation.

The sense of the sensor is determined either by the vector $\overrightarrow{OE}$ or by the vector $-\overrightarrow{OE}$. For example, the algebraic ratio $$\frac{\overline{AE}}{\overline{AB}}$$

determines the oriented direction of the sensor, with A and B the mappings in the image plane of two points $A_0$ and $B_0$ of the sensor as represented in FIG. 6.

Moreover, if $t_i \cdot (a_{i3}-a_{i1})-(a_{i3}-a_{i2})=0$, this is the case where the sensor is parallel to the image plane. In this latter case, the oriented direction of the sensor is directly determined by the vector $\overrightarrow{AB}$.

The invention therefore makes it possible to ascertain the direction and the sense of a sensor placed on a mobile object on the basis of the simple determination in the image plane of the vanishing point of the straight line comprising the sensor, the calculation being carried out by virtue of the projection onto the sensor of test grids of GHOST type.

The invention makes it possible, based on two sensors positioned on the mobile part, whose relative position is known, based on the projection of GHOST test grids, to determine the posture of the two sensors and therefore of the mobile part.

Figure 5:
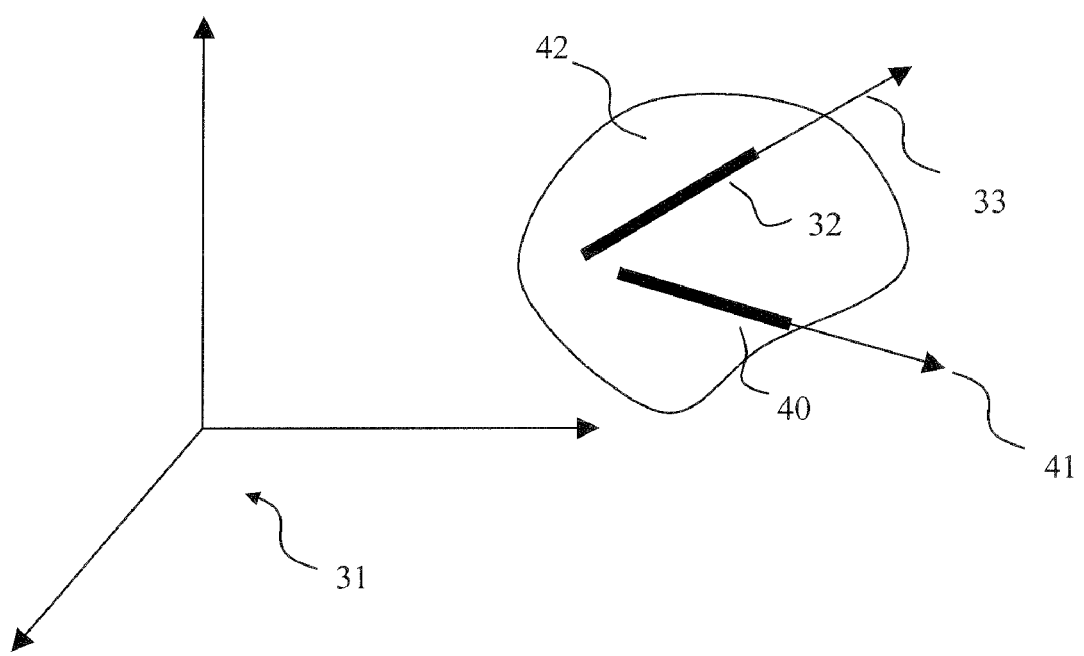
FIG. 5: a principle for constructing the projection of the vanishing point of the straight line comprising a sensor.

FIG. 5 represents a mobile part 42, the posture of which is sought in a benchmark frame 31. The mobile part 42 comprises two sensors 32, 40 whose senses are determined respectively by the vectors 33, 41.

The invention makes it possible to determine the attitude of the mobile part on the basis of the determination of the attitude of at least two non-collinear sensors linked rigidly with the mobile part.

Thus according to the principle of the invention, the rotation and the translation of a mobile part with respect to a reference position in space are determined on the basis of two sensors each formed, for example, of a linear CCD.

The conditions for determining the posture of an object in space comprise notably:
- the definition of a fixed part comprising an image projector and an image plane linked with the fixed part;
- the projection of test grids comprising two secant networks of at least three parallel straight lines in each zone comprising a sensor;
- the rigid links of the sensors with the mobile part, their positions being known on the mobile part, these sensors not being parallel.

FIG. 6 represents a posture of the mobile object, the posture of the object being identified by a disposition of the sensors in space, having undergone a translation and a rotation. FIG. 6 also represents a reference posture of the object, a reference disposition of the sensors in space being known.

The components of the motion of the mobile object in space, that is to say the rotation and the translation undergone by the object, are determined on the basis of the projections in the image plane of the fixed part of two sensors rigidly linked with the object.

If the vector bearing the first sensor 32 of a reference position known in the reference frame 31 is dubbed $\overrightarrow{A_0 B_0}$ and the vector bearing the second sensor 40 of the reference position known in the reference frame 31 is dubbed $\overrightarrow{K_0 L_0}$, then it is possible to write the unit vectors $\vec{e_0}$ and $\vec{f_0}$ respectively determined by the relations:

$$\vec{e_0} = \frac{\overrightarrow{A_0 B_0}}{\overline{A_0 B_0}}$$

$$\vec{f_0} = \frac{\overrightarrow{K_0 L_0}}{\overline{K_0 L_0}};$$

we write $\vec{u_0} = \vec{e_0} \wedge \vec{f_0}$.

If A', B', K' and L' denote the images of the points $A_0$, $B_0$, $K_0$ and $L_0$ after the rotation and the translation undergone by the mobile object, denoting by $\vec{t}$, the translation, and r, the rotation, the following relations are obtained:

$$\overrightarrow{OA'} = \vec{t} + r(\overrightarrow{OA_0});$$

$$\overrightarrow{OB'} = \vec{t} + r(\overrightarrow{OB_0});$$

$$\overrightarrow{OK'} = \vec{t} + r(\overrightarrow{OK_0});$$

$$\overrightarrow{OL'} = \vec{t} + r(\overrightarrow{OL_0});$$

where O is the origin of the reference frame 31.

The vectors of the electro-optical device become:

$$\overrightarrow{A'B'} = r(\overrightarrow{A_0 B_0});$$

$$\overrightarrow{K'L'} = r(\overrightarrow{K_0 L_0})$$

The method recalled in the description of FIGS. 1 and 2, as well as its application to determine the mappings in the image plane of the fixed part of a vanishing point of a straight line in space, allows us to find vectors $\vec{E}$ and $\vec{F}$, such that:

$\vec{E}$ is nonzero and positively proportional to $\overrightarrow{A'B'}$;

$\vec{F}$ is nonzero and positively proportional to $\overrightarrow{K'L'}$.

It is then possible to define the two normed vectors $\vec{e}$ and $\vec{f}$, such that:

$$\vec{e} = \frac{\vec{E}}{\|\vec{E}\|};$$

$$\vec{f} = \frac{\vec{F}}{\|\vec{F}\|}.$$

The following relations are therefore obtained:

$$\vec{e} = \frac{\overrightarrow{A'B'}}{\overline{A'B'}};$$

$$\vec{f} = \frac{\overrightarrow{K'L'}}{\overline{K'L'}}.$$

Let us denote by $\vec{u}$ the vector such that $\vec{u}=\vec{e}\wedge\vec{f}$. By assumption the straight lines $(A_0B_0)$ and $(K_0L_0)$ are not parallel, the matrix $[\vec{e_0}; \vec{f_0}; \vec{u_0}]$ is invertible and the formula giving the rotation r directly is obtained:

$$r=[\vec{e};\vec{f};\vec{u}]\cdot[\vec{e_0};\vec{f_0};\vec{u_0}]^{-1}$$

The matrix $[\vec{e_0}; \vec{f_0}; \vec{u_0}]^{-1}$ is a fixed data item linked with the chosen pair of sensors and to the reference posture, the calculation of which arises from measurements, this calculation therefore being done once and for all with the desired accuracy.

Let us determine the translation $\vec{t}$ on the basis of the mappings A' and B' on the image plane of the points A and B belonging to the straight line comprising the first linear sensor. Denoting by µ the known real such that $\overrightarrow{AE}=\mu\overrightarrow{AB}$ and by k the real such that $\overrightarrow{OA'}=k\cdot\overrightarrow{OA}$, the following relations are then obtained:

$$\mu = \frac{\overline{AE}}{\overline{AB}},$$

and then $$k = |\mu - 1|\frac{A_0B_0}{OE};$$

the translation is then deduced according to the following relation:

$$\vec{t}=k\overrightarrow{OA}-r(\overrightarrow{OA_0})$$

The advantages of the invention make it possible:
to relax constraints of mechanical accuracy on the sensor, and therefore:
  to use a much more generic and therefore less expensive sensor;
  to transfer the problem of mechanical tolerancing to a matter of installation on the helmet;
  to avoid certain constraints regarding exportation restrictions linked with the specificity of the sensor;
  to simplify the management of the endurance of the sensor component;
  to dispense with the step of factory characterization and calibration of the sensor.

Moreover, switching from an extensive sensor, of the square-shaped type, to a linear sensor makes it possible:
  to relax the on-helmet installation constraints, indeed it becomes simpler to place on the surface of the helmet a linear sensor than a square sensor;
  to limit the number of sensors mounted on the helmet, thereby making it possible to limit the mass and the associated signal processing;
  to envisage mounting bigger sensors and therefore to improve the measurement accuracy of the system, indeed the size of the sensor is a significant element in the accuracy of the system; in the case of a linear sensor, it is possible to double the size of the sensor on a helmet;
  to have a sensor which has very little sensitivity to expansion and therefore to ambient temperature. The sensor being linear, its expansion does not transform its associated direction vector and therefore has zero impact on the attitude measurement carried out, on the other hand it may have an impact on the position measurement.

Finally, the necessary calculational power is reduced with respect to an approach based on parallel CCD-type sensors since the present invention affords direct access to the vanishing point linked with the direction vector instead of having to determine it by intersection of virtual points. The benefit linked with this calculational advance does not relate so much to the saving in processing resources but to the fact that the use of a single estimator makes it possible to minimize the propagation and the occasions of amplification of the measurement errors.

Moreover, if several sensors are simultaneously within visibility, an increase in the accuracy of the measurement through a mean of the postures can be effected, for example such as a mean rotation and a mean translation.

It is also possible to take a mean of the LOS vectors measured, the initials standing for "Line Of Sight".

Indeed, N linear sensors within visibility define $C_N^2$ bases and therefore as many attitude measurements.

The invention claimed is:

1. Electro-optical system for determining the attitude of a mobile part comprising means for determining at least one direction of the said mobile part, the said system comprising a fixed part having a reference point (O) and a mobile part, the fixed part being linked rigidly with an image plane, wherein the mobile part is linked rigidly with at least one first linear electro-optical device defining a first direction vector, the fixed part projecting in a first zone comprising the first electro-optical device, at least two networks of beams, whose intersection with a plane perpendicular to the mean axis of projection defines at least two networks of non-parallel straight lines, each of the networks of straight lines comprising at least three parallel segments, the beams intercepting the electro-optical device in at least two pairs of triples of points, the system comprising means for calculating a first calculation comprising the determination of the position of a first point (E) in the image plane on the basis of the positions of the six projections in the image plane of the two pairs of triples of points, the first point (E) corresponding to the vanishing point of the straight line comprising the first direction vector, the straight line comprising the reference point (O) and the first point (E) determining a first direction, the said direction representing the direction of the straight line comprising the first linear electro-optical device.

2. Electro-optical system for determining the attitude of a mobile part comprising means for determining at least one direction of the said mobile part according to claim 1, wherein the projection comprises a test grid comprising on the one hand a first network of beams of three first mutually parallel luminous segments, intercepting the sensor at three points $(A_1, B_1, C_1)$, and on the other hand a second network of beams of three mutually parallel luminous segments, intercepting the sensor at three other points $(A_2, B_2, C_2)$, the two networks of beams making an angle between themselves such that the form of the two networks of beams represents a broken line forming at least three sawteeth.

3. Electro-optical system for determining the attitude of a mobile part comprising means for determining at least one direction of the said mobile part according to claim 1, wherein the system successively projects two test grids comprising respectively a first and a second network of beams having the same characteristics, for which the orientation of the second network of beams with respect to the first network of beams forms a determined angle, the networks of beams having a sufficient width (D) to cover the zone of displacement of the sensor and comprising a determined number of parallel segments, for which the cross ratios of four consecutive segments are all different.

4. Electro-optical system for determining the attitude of a mobile part comprising means for determining at least one direction of the said mobile part according to one of claims 2 and 3, wherein a second electro-optical device is linked rigidly with the mobile part, the said second device defining a second direction vector, not collinear with the first direction vector, the position of the second device with respect to the first device being known in a benchmark frame linked with the mobile part, a third calculation of the position of a second point (F) arising from the projection in the image plane of the vanishing point of the straight line comprising the second direction vector, the straight line comprising the reference point (O) and the second point (F) determining a second direction, the said second direction representing the direction of the straight line comprising the second linear electro-optical device.

5. Electro-optical system for determining the attitude of a mobile part comprising means for determining at least one direction of the said mobile part according to claim 4, wherein the second linear electro-optical device being oriented by a second pair of points ($K_0$, $L_0$) situated on the second linear electro-optical device, a fourth calculation of the positions of the mappings (K, L) on the image plane of the second pair of points situated on the second linear electro-optical device ($A_0$, $B_0$) determines the sense of the said second linear electro-optical device in space by comparison of the order of alignment of the second pair of projected points (K, L) and of the second point (F) in the image plane.

6. Electro-optical system for determining the attitude of a mobile part according to claim 4, wherein the first calculation and/or the third calculation comprises the determination:
   of a point M(X,Y) belonging to the straight line comprising a linear electro-optical device;
   of a first quadruple of points defined by the mapping of the point M and of a first triple of points;
   of a second quadruple of points defined by the mapping of the point M and of a second triple of points;
   of the relative positions of the points of the two triples of points on an electro-optical device;
   of the position of the mapping in the image plane of the point M on the basis of the law of conservation of a cross ratio of a quadruple of points under a central projection;
   of the position of a vanishing point (E, F), corresponding to the mapping of the point M when the latter is considered positively at infinity on the straight line comprising an electro-optical device.

7. Electro-optical system for determining the attitude of a mobile part according to claim 6, wherein the mobile part undergoes a motion which decomposes into a rotation and a translation in space which are charted with respect to a reference position, the rotation of the mobile part in space being determined by the means for calculating a fifth calculation comprising:
   a first step of determining:
      a first normed direction vector $\vec{e_0}$ collinear with the vector formed by the first pair of points ($A_0$, $B_0$), corresponding to a known reference position of the first electro-optical device;
      a second normed direction vector $\vec{f_0}$ collinear with the vector formed by the second pair of points ($K_0$, $L_0$) corresponding to a known reference position of the second electro-optical device;
      a third normed vector $\vec{u_0}$, the vector product of the first and second vector;
   a second step of calculating:
      the positions of the vanishing points E and F respectively of the straight lines comprising the image vector ($\overrightarrow{A'B'}$) by the rotation r of the first direction vector ($\overrightarrow{A_0B_0}$) and the image vector ($\overrightarrow{K'L'}$) by the rotation r of the second vector ($\overrightarrow{K_0L_0}$);
      the vectors $\overrightarrow{OE}$ and $\overrightarrow{OF}$;
      fourth and fifth normed vectors $\vec{e}$ and $\vec{f}$ collinear respectively with $\overrightarrow{OE}$ and $\overrightarrow{OF}$;
      a sixth normed vector $\vec{u}$, the vector product of the fourth and fifth vectors;
   a third step of determining the rotation r by the product of a first matrix formed of the first, second and third vectors and of the inverse of a second matrix formed of the fourth, fifth and sixth vectors, the analytical expression of the rotation being:

$$r=[\vec{e};\vec{f};\vec{u}]\cdot[\vec{e_0};\vec{f_0};\vec{u_0}]^{-1}.$$

8. Electro-optical system for determining the attitude of a mobile part according to claim 7, wherein the translation t is determined through the relation:

$$\vec{t}=k\overrightarrow{OA}-r(\overrightarrow{OA_0}),$$

where O is the reference point of the fixed part, A the mapping in the image plane of a known point of the first electro-optical device, denoted $A_0$, and k is expressed in the following manner:

$$k=(\mu-1)\frac{A_0B_0}{OE},$$

where E is the image of the vanishing point in the image plane and $B_0$ is a second known point of the second linear electro-optical device, and μ is a known real expressed in the following manner:

$$\overrightarrow{AE}=\mu\overrightarrow{AB}.$$

9. Electro-optical system for determining the attitude of a mobile part comprising means for determining at least one direction of the said mobile part according to one of claims 2 and 3, wherein the linear electro-optical device being oriented by a first pair of points ($A_0$, $B_0$) situated on the electro-optical device, a second calculation of the positions of the mappings (A, B) of the first pair of points ($A_0$, $B_0$) on the image plane determines the sense of the said electro-optical device in space by comparison of the order of alignment of the first pair of projected points (A, B) and of the first point (E) in the image plane.

10. Electro-optical system for determining the attitude of a mobile part comprising means for determining at least one direction of the said mobile part according to one of claims 3 to 9, wherein the comparison of two successively calculated directions of a sensor determines a component of the motion of the mobile object in space.

11. Electro-optical system for determining the attitude of a mobile part comprising means for determining at least one direction of the said mobile part according to claim 3, wherein the electro-optical device is a linear sensor, the fixed part is a video image projector and the mobile object is a pilot helmet.

12. Pilot helmet according to claim 11, wherein it comprises at least two non-collinear linear electro-optical devices.

* * * * *

UNITED STATES PATENT AND TRADEMARK OFFICE
CERTIFICATE OF CORRECTION

PATENT NO. : 8,243,992 B2  Page 1 of 1
APPLICATION NO. : 12/566985
DATED : August 14, 2012
INVENTOR(S) : Siegfried Rouzes and Lilian Lacoste It is certified that error appears in the above-identified patent and that said Letters Patent is hereby corrected as shown below:

In the Specification:

Column 5, line 52, delete the equation and insert -- $\vec{t} = k\vec{OA} - r(\overline{OA_0})$ --;
Column 7, line 49, delete the ",";
Column 14, line 8, delete the equation and insert -- $x \sin \Theta 1 - y \cos \Theta 1 = c_{1M}$ --;

In the Claims:

Column 20, Claim 10, line 55, delete "to" and insert -- and --.

Signed and Sealed this
Third Day of November, 2015

Michelle K. Lee
*Director of the United States Patent and Trademark Office*